United States Patent [19]

Ueda et al.

[11] 4,418,184

[45] Nov. 29, 1983

[54] PROCESS FOR PREPARATION OF ETHYLENE POLYMER WAX

[75] Inventors: Takashi Ueda, Ohtake; Norio Kashiwa, Iwakuni, both of Japan

[73] Assignee: Mitsui Petrochemical Industries, Ltd., Tokyo, Japan

[21] Appl. No.: 360,440

[22] Filed: Mar. 22, 1982

Related U.S. Application Data

[63] Continuation of Ser. No. 157,009, Jun. 6, 1980, abandoned.

[30] Foreign Application Priority Data

Jun. 11, 1979 [JP] Japan ................................ 54-72221

[51] Int. Cl.$^3$ .......................... C08F 2/40; C08F 10/02
[52] U.S. Cl. .................................... 526/125; 526/114; 526/122; 526/124; 526/127; 526/128; 526/133; 526/151; 526/348; 526/348.4; 526/352; 526/905; 585/512; 585/513; 585/520
[58] Field of Search ............... 526/114, 122, 124, 125; 585/512, 513, 520

[56] References Cited

U.S. PATENT DOCUMENTS

| | | | |
|---|---|---|---|
| 4,172,050 | 10/1979 | Gessell | 526/151 |
| 4,189,553 | 2/1980 | Birkelbach | 526/151 |
| 4,198,315 | 4/1980 | Birkelbach et al. | 526/151 |
| 4,224,186 | 9/1980 | Lowery et al. | 526/151 |

FOREIGN PATENT DOCUMENTS

| | | |
|---|---|---|
| 1929863 | 12/1970 | Fed. Rep. of Germany . |
| 1329334 | 9/1973 | United Kingdom . |
| 1500873 | 2/1978 | United Kingdom . |
| 1536348 | 12/1978 | United Kingdom . |

*Primary Examiner*—Edward J. Smith
*Attorney, Agent, or Firm*—Sherman & Shalloway

[57] ABSTRACT

Improved process for preparing an ethylene polymer wax which comprises polymerizing ethylene or copolymerizing ethylene with up to 10 mole % of an alpha-olefin having 3 to 20 carbon atoms in the presence of (A) a highly active titanium catalyst component activated by a magnesium compound and (B) an organoaluminum catalyst component composed of (B-1) an organoaluminum compound free from halogen bonded directly to the aluminum atom and (B-2) a halogen compound of an element selected from the group consisting of elements other than titanium of Groups III and IV of the Mendelejeff's periodic table, the atomic ratio of halogen to aluminum in the organoaluminum catalyst component (B) being from about 1:6 to about 9:10, provided that when said halogen compound is a halogen compound of carbon, this atomic ratio is from about 1:6 to about 10:1, and said polymerization or copolymerization being carried out under such conditions that the concentration of ethylene polymer wax in the polymerization or copolymerization system is about 200 to about 600 g/liter of solvent, to form a wax having a viscosity average molecular weight of up to about 6000.

14 Claims, No Drawings

PROCESS FOR PREPARATION OF ETHYLENE POLYMER WAX

This is a continuation, of application Ser. No. 157,009, filed June 6, 1980, now abandoned.

This invention relates to a process for preparing an ethylene polymer wax, and particularly, to a commercially advantageous process for preparing an ethylene polymer wax having a viscosity average molecular weight of up to about 6000 with a good reproducibility of quality and high catalytic activity at relatively low hydrogen pressures while inhibiting an undesirable side-reaction of forming ethane.

More specifically, this invention pertains to a process for preparing an ethylene polymer wax which comprises polymerizing ethylene or copolymerizing ethylene with up to 10 mole% of an alpha-olefin having 3 to 20 carbon atoms in an inert hydrocarbon solvent at a temperature of about 140° C. to about 300° C. and a pressure of about 5 to about 200 kg/cm$^2$.G in the presence of hydrogen and a catalyst composed of (A) a highly active titanium catalyst component activated by a magnesium compound and (B) an organoaluminum catalyst component; characterized in that (i) said organoaluminum catalyst component is composed of
  (B-1) an organoaluminum compound free from halogen bonded directly to the aluminum atom and
  (B-2) a halogen compound of an element selected from the group consisting of elements other than titanium of Groups III and IV of the Mendelejeff's periodic table,
the atomic ratio of halogen to aluminum in the organoaluminum catalyst component (B) being from about 1:6 to about 9:10, provided that when said halogen compound is a halogen compound of carbon, this atomic ratio is from about 1:6 to about 10:1, and (ii) said polymerization or copolymerization is carried out under such conditions that the concentration of the ethylene polymer wax in the polymerization or copolymerization system is about 200 to about 600 g/liter of solvent, to form a wax having a viscosity average molecular weight of up to about 6000.

Use of various highly active titanium catalyst components activated by a magnesium compound has previously been suggested in order to produce in high yields per unit weight of catalyst component a high-molecular-weight ethylene polymer and high-molecular-weight copolymers of ethylene with alpha-olefins having at least 3 carbon atoms which are useful as molding materials for various shaped articles such as films, sheets and plates.

In utilizing such a highly active titanium catalyst component in the production of olefin waxes, however, no detail has yet been elucidated about its combination with an organoaluminum catalyst component and its action and effect on the formation of the waxes. It is known that an ethylene polymer wax can be produced by polymerizing ethylene in the presence of a large quantity of hydrogen. On the other hand, since technical troubles associated with the production of waxes differ from those in the production of plastics, the behavior of the highly active titanium catalyst component activated by a magnesium compound in the production of waxes cannot virtually be predicted from that in the production of plastics.

Production of low-molecular-weight waxes such as an ethylene polymer wax, especially an ethylene polymer wax having a viscosity average molecular weight of up to about 6000, involves technical problems which are difficult to solve by a single expedient. It has been desired therefore to develop a commercially advantageous method which can afford these low-molecular-weight waxes in satisfactory yields with a good reproducibility of quality and high catalytic activity while inhibiting side-reactions.

One of the technical problems associated with the production of such low-molecular-weight waxes is that when ethylene is polymerized in the presence of a large quantity of hydrogen, an undesirable side-reaction of forming ethane by hydrogenation of ethylene takes place to an unnegligible extent to consume the starting ethylene excessively, and the amount of the wax formed per unit amount of consumed ethylene decreases. If the amount of hydrogen is increased in an attempt to obtain a wax having a sufficiently low viscosity average molecular weight, the activity of the catalyst substantially decreases, and the desired low viscosity average molecular weight is difficult to obtain with satisfactory catalytic activity. Another problem is that choice of a catalyst suitable for production of such a low-molecular-weight wax is difficult, and depending upon the choice, it is practically impossible to afford a product containing a wax of the desired low molecular weight as a main component.

It is known from British Pat. No. 1,329,334 that an ethylene polymer wax having a viscosity average molecular weight of 400 to 20000 is produced by using a catalyst composed of (A) a highly active titanium catalyst component and (B) an organoaluminum catalyst component. This British Patent exemplifies trialkyl aluminums, dialkyl aluminum halides, alkyl aluminum sesquihalides, alkyl aluminum dihalides and dialkyl aluminum alkoxides or aryloxides as the organoaluminum catalyst component (B).

Investigations of the present inventors have shown that the process of the cited British Pat. No. 1,329,334 still leaves room for improvement in regard to the inhibition of an ethane-forming side-reaction, the formation of a wax of a low viscosity average molecular weight in a relatively low hydrogen pressure range in a high yield, and the reproducibility of the quality of the resulting wax.

The present inventors have made investigations in order to provide an improved process which can achieve such an improvement.

These investigations have led to the discovery that the aforesaid improvement can be achieved by polymerizing ethylene or copolymerizing it with up to 10 mole% of an alpha-olefin having 3 to 20 carbon atoms under the following conditions (i) and (ii) described hereinabove:

(i) there is used an organoaluminum catalyst component composed of (B-1) an organoaluminum compound free from halogen bonded directly to the aluminum atom and (B-2) a halogen compound of an element selected from the group consisting of elements other than titanium of Groups III and IV of the Mendelejeff's periodic table, the atomic ratio of halogen to aluminum in the organoaluminum catalyst component (B) being from about 1:6 to about 9:10, provided that when said halogen compound is a halogen compound of carbon, this atomic ratio is from about 1:6 to about 10:1, and (ii) the polymerization or copolymerization is carried out under conditions such that the concentration of the ethylene polymer wax in the polymerization or copolymerization system is about 200 to about 600 g/liter of solvent, to form a wax having a viscosity average molecular weight of up to about 6000.

It is an object of this invention therefore to provide an improved process for producing an ethylene polymer wax having a viscosity average molecular weight of up to about 6000.

The above and other objects and advantages of this invention will become more apparent from the following description.

The highly active titanium catalyst component activated by a magnesium compound (component A) is preferably a component capable of producing at least about 50 g of an ethylene polymer per mg of titanium under the reaction conditions employed.

The titanium catalyst component (A) may be a solid component, or a liquid component resulting from dissolving of a magnesium compound, a solubilizing agent and a titanium compound in a solvent such as a hydrocarbon. Titanium in the catalyst component (A) is usually tetravalent or trivalent.

A preferred solid titanium catalyst component (A) comprises titanium, magnesium and halogen as essential ingredients. Such a solid titanium catalyst component (A) has a titanium content of preferably about 0.2 to about 18% by weight, more preferably about 0.3 to about 15% by weight, a halogen/titanium mole ratio of preferably from about 4 to about 300, more preferably from about 5 to about 200, and a specific surface area of preferably at least about 10 m$^2$/g, more preferably about 20 to about 1000 m$^2$/g, more preferably about 40 to about 900 m$^2$/g.

Such a solid highly active titanium catalyst component (A) is widely known, and can be prepared basically by a process which comprises reacting a magnesium compound with a titanium compound to obtain a reaction product having a high specific surface area, or by reacting a magnesium compound having a high specific surface area with a titanium compound. Typical procedures include, for example, copulverization of a magnesium compound and a titanium compound, reaction of a magnesium compound having a sufficiently high specific surface area with a titanium compound under heat, reaction of an oxygen-containing magnesium compound with a titanium compound under heat, and reaction of a magnesium compound treated with an electron donor with a titanium compound with or without prior treatment of the magnesium compound with an organoaluminum compound or a halogen-containing silicon compound.

Examples of the magnesium compound that can be used in the production of the solid highly active titanium catalyst component (A) include magnesium chloride, magnesium bromide, magnesium iodide, magnesium fluoride, magnesium hydroxide, magnesium oxide, magnesium hydroxyhalides, alkoxy magnesiums, alkoxy magnesium halides, aryloxy magnesiums, aryloxy magnesium halides, alkyl magnesium halides, and mixtures of these. These magnesium compounds may be those which are produced by any method of production, and may also contain other metals or electron donors.

Examples of the titanium compound used in the production of the solid highly active titanium catalyst component (A) are tetravalent titanium compounds of the formula $$Ti(OR)_{4-m}X_m$$

wherein R represents a hydrocarbon group such as an alkyl group having 1 to 20 carbon atoms or an aryl group having 6 to 20 carbon atoms, X represents a halogen atom, and m represents a number defined by $0 \leq m \leq 4$.

Examples of such titanium compounds are $TiCl_4$, $TiBr_4$, $Ti(OC_2H_5)Cl_3$, $Ti(OC_2H_5)_2Cl_2$, $Ti(OC_6H_5)_3Cl$, and $Ti(OC_2H_5)_4$. There can also be used various titanium trihalides, such as titanium trichloride, obtained by reducing titanium tetrahalides with reducing agents such as aluminum, titanium, hydrogen or organoaluminum compounds. If desired, these titanium compounds may be used in combination with each other.

Typical methods for preparing such a solid highly active titanium catalyst component (A) are disclosed, for example, in U.S. Pat. Nos. 3,642,746, 3,759,884, 3,644,318, 4,071,674 and 4,071,672, and British Pat. Nos. 1,286,867 and 1,292,853, and these known methods can be used in this invention.

A method for obtaining a soluble highly active titanium component (A) is disclosed, for example, in Japanese Patent application No. 151998/78. In this case, the titanium compound needs not to be mixed in advance with a magnesium compound, and it may be contacted with the magnesium compound in the polymerization system to attain high activity.

In the process of this invention, an organo-aluminum catalyst component (B) composed of the compounds (B-1) and (B-2) is used in combination with the titanium catalyst component (A).

Examples of the organoaluminum compound free from halogen bonded directly to the aluminum atom (B-1) include trialkyl aluminums, alkyl aluminum hydrides and the addition products or complex compounds of these. Specific examples are trialkyl aluminums having a $C_1$-$C_{15}$ alkyl group such as triethyl aluminum, tripropyl aluminum, triisobutyl aluminum, trihexyl aluminum, trioctyl aluminum, tridecyl aluminum and triisoprenyl aluminum; and alkyl aluminum hydrides having a $C_1$-$C_{15}$ alkyl group. Examples of the adducts or complexes of these trialkyl aluminums or aluminum hydrides are adducts or complexes of these trialkyl aluminums or aluminum hydrides with Grignard reagents, dialkyl magnesium having a $C_1$-$C_{15}$ alkyl group, such as dibutyl magnesium, butylhexyl magnesium or dihexyl magnesium, or electron donors.

Examples of the electron donors mentioned above include $C_1$-$C_{18}$ aliphatic alcohols such as methanol, ethanol, propanol, isopropanol, butanol, tert-butanol, isoamyl alcohol, hexanol and octanol; $C_6$-$C_{16}$ phenols such as phenol, o-, m-, and p-cresols and resorcinol; $C_2$-$C_{32}$ saturated or unsaturated aliphatic aliphatic ethers such as dimethyl ether, diethyl ether, di-n-butyl ether, diisobutyl ether, methyl n-butyl ether, n-butyl n-pentyl ether, dioctyl ether, 2-methoxy-2-butene, methyl methacryl ether and vinyl methyl ether; $C_7$-$C_{16}$ aromatic ethers such as anisole, phenetole, allyl phenyl ether and dimethoxybenzene; unsaturated aliphatic monoesters synthesized from $C_3$-$C_{17}$ unsaturated aliphatic monocarboxylic acids and $C_1$-$C_{20}$ alcohols, such as methyl acrylate, n-amyl acrylate, methyl methacrylate, methyl undecylenate and ethyl crotonate; saturated aliphatic esters synthesized from $C_1$-$C_{20}$ saturated aliphatic monocarboxylic acids and $C_1$-$C_{16}$ alcohols, such as methyl formate, methyl acetate, n-butyl acetate, ethyl butyrate and ethyl laurate; aromatic carboxylic acid esters synthesized from $C_7$–$C_{18}$ aromatic carboxylic acids and $C_1$–$C_{20}$ alcohols, such as methyl benzoate, ethyl benzoate, isoamyl benzoate and butyl o-, m- or p-toluate; $C_1$–$C_{20}$ saturated or unsaturated aliphatic carboxylic acids such as formic acid, acetic acid, butyric acid, acrylic acid, methacrylic acid and undecylenic acid; $C_7$–$C_{18}$ aromatic carboxylic acids such as benzoic acid and o-, m- or p-toluic acid; $C_3$–$C_{20}$ aliphatic ketones such as acetone, methyl ethyl ketone, diethyl ketone and dibutyl ketone; $C_7$–$C_{18}$ aromatic ketones such as acetophenone, benzophenone, methyl benzophenone, phenyl ethyl ketone and phenyl tert-butyl ketone; $C_1$–$C_{18}$ saturated aliphatic primary amines such an methylamine, ethylamine, butylamine isobutylamine, 3-amino-2-methylbutane, octylamine and octadecylamine; $C_2$–$C_{24}$ saturated aliphatic secondary amines such as dimethylamine, diethylamine, dibutylamine and didodecylamine; $C_3$–$C_{18}$ saturated aliphatic tertiary amines such as trimethylamine, tributylamine and trihexylamine, $C_6$–$C_{20}$ aromatic amines such as aniline, o-, m-, or p-toluidine, xylidine, naphthylamine, N-methylaniline, N-ethylaniline, N,N-dimethylaniline, diphenylamine and triphenylamine; and $C_5$–$C_{18}$ heterocyclic amines such as pyridine, 2-picoline, 3-picoline, 5-ethyl-2-methyl pyridine, 2-phenyl pyridine and 1,2,3,4-tetramethyl pyridine.

When the aforesaid adduct or complex is a complex or adduct of a magnesium compound, this magnesium compound is sometimes utilized in making the titanium compound highly active.

Examples of the halogen compound (B-2) of an element selected from the group consisting of elements other than titanium of Groups III and IV of the Mendelejeff's periodic table include halogen compounds of elements of Group III, especially halides, or halogen compounds having a $C_1$–$C_{15}$ alkyl or alkoxy group, such as $B(OC_2H_5)Cl_2$, $BF_3$, $GaCl_3$, $LaCl_3$, $AlCl_3$, $C_2H_5AlCl_2$, $C_2H_5AlBr_2$, $C_2H_5AlI_2$, $C_4H_9AlCl_2$, $(C_2H_5)_{1.5}AlCl_{1.5}$, $(C_4H_9)_{1.5}AlCl_{1.5}$, $(C_2H_5)_2AlCl$, $(C_4H_9)_2AlCl$, and $(C_2H_5)AlHCl$; halogenated hydrocarbons (halogen compounds of carbon), especially halogen compounds of $C_1$–$C_{20}$ aliphatic hydrocarbons or aromatic hydrocarbon halides, such as $CH_3Cl$, $C_2H_5Cl$, $C_2H_4Cl_2$, $C_3H_7Cl$, $C_4H_9Cl$, $C_6H_{11}Cl$ and chlorobenzene; halogen compounds, especially halides, or halogen compounds containing a $C_1$–$C_{12}$ alkyl or alkoxy group, of silicon, such as $SiCl_4$, $Si(OC_2H_5)Cl_3$, $Si(OC_2H_5)_2Cl_2$, $Si(OC_4H_9)_3Cl$ and $C_2H_5SiCl_3$; halogen compounds, especially halides or halogen compounds containing a $C_1$–$C_{12}$ alkoxy group, of germanium such as $GeCl_4$, $Ge(OCH_3)Cl_3$, $Ge(OC_2H_5)_2Cl_2$ and $Ge(OC_3H_7)_3Cl$; and halogen compounds, especially halides or $C_1$–$C_{12}$-alkoxy-containing halogen compounds, of elements of Group IV, such as $SnCl_2$, $SnCl_4$, $PbCl_4$, $ZrCl_4$ and $Zr(OC_2H_5)_2Cl_2$.

Halogen compounds of an element selected from the group consisting of Al, Si and C are preferred.

In the organoaluminum catalyst component (B), the atomic ratio of halogen to aluminum is from about 1:6 to about 9:10, preferably from about 1:5 to about 9:10. When a halogen compound of carbon is used as the compound (B-2), the ratio of halogen to aluminum is from about 1:6 to about 10:1, preferably from about 1:6 to about 8:10.

According to the process of this invention, the polymerization or copolymerization is carried out under such conditions that the concentration of the ethylene polymer wax in the polymerization or copolymerization system is about 200 to about 600 g/liter of solvent, to form a wax having a viscosity average molecular weight of up to about 6000. The temperature and pressure conditions for the polymerization or copolymerization may be those known per se. Preferably, the polymerization or copolymerization is carried out in an inert hydrocarbon solvent at a temperature of about 140° C. to about 300° C. and a pressure of about 5 to about 200 kg/cm².G.

Preferred inert hydrocarbon solvents for use in this invention are aliphatic or alicyclic hydrocarbons such as pentane, bexane, heptane, octane, decane, kerosene, cyclopentane, methylcyclopentane, cyclohexane and methylcyclohexane. In such a hydrocarbon solvent, the polymerization or copolymerization is carried out under such conditions that the concentration of the wax is about 200 g to about 600 g/liter of solvent, preferably about 250 g to about 400 g/liter of solvent.

The process of this invention is performed in the presence of hydrogen. The amount of hydrogen is properly chosen depending upon the polymerization temperature or pressure, etc. Generally, it is recommended that the partial pressure of hydrogen is maintained at more than about 3 kg/cm², preferably more than about 5 kg/cm², and the ratio of the partial pressure of hydrogen to that of ethylene is maintained at more than about 0.7, preferably at more than about 1. The polymerization pressure is about 5 to about 200 kg/cm².G, preferably about 10 to about 200 kg/cm², especially from about 15 to about 100 kg/cm².G.

In the polymerization, it is preferred to adjust the concentration of the titanium catalyst component (A) to about 0.0005 to about 1 millimole/liter, especially about 0.001 to about 0.5 millimole/liter, calculated as titanium atom, and to select the amount of the organo-aluminum catalyst component (B) composed of the compounds (B-1) and (B-2) such that the atomic ratio of aluminum in the component (B) to titanium in the component (A) is from about 5 to about 2000, preferably from about 20 to about 500.

When the compound (B-2) is a halogen compound of carbon, the atomic ratio of halogen in compound (B-2) to aluminum in compound (B-1) is preferably maintained at more than 1:6 to 10:1, especially at not more than 5:1.

The compounds (B-1) and (B-2) in this invention can be used in various modes. For example, the compounds (B-1) and (B-2) may be fed separately into a polymerization vessel and contacted with the component (A). Or a part of the compound (B-1) is mixed with the compound (B-2), and the mixture and the remainder of the compound (B-1) are separately fed into a polymerization vessel and contacted with the component (A). There may also be employed a procedure in which the component (A) and the compound (B-2) are mixed, and the mixture is contacted with the compound (B-1) in a polymerization vessel.

The polymerization can be performed either continuously or batchwise. The polymerization includes not only the homopolymerization of ethylene, but also the copolymerization of ethylene with an alpha-olefin having 3 to 20 carbon atoms. Alpha-olefins as comonomers include propylene, 1-butene, 1-pentene, 1-hexene, 1-octene, 1-decene, 1-dodecene, 1-tetradecene, 1-octadecene, 4-methyl-1-pentene, and mixtures of these. In the copolymerization, the proportion of ethylene is preferably at least about 90 mole%.

The process of this invention affords a viscosity average molecular weight of up to about 6000, for example about 500 to about 6000, preferably from about 500 to about 4000, more preferably from about 700 to about 4000.

When ethylene is copolymerized with an alpha-olefin having at least 4 carbon atoms by the process of this invention, the resulting wax usually has a $\sigma_{(\leq 120°C.)}/\sigma_o$ ratio of less than 0.82, frequently from 0 to 0.81. In the above ratio, $\sigma_o$ represents the total area defined by the endothermic spectral line and the base line thereof in differential scanning calorimetry, and $\sigma_{(\leq 120°C.)}$ represents the area defined by the endothermic spectral line at 120° C. or below in the endothermic spectrum and the base line thereof.

Accordingly, the process of this invention is favorably used in the production of ethylene homopolymer wax, an ethylene/propylene copolymer wax, and waxes of copolymer of ethylene and $C_4$-$C_{20}$ alpha-olefins which have a $\sigma_{(\leq 120°C.)}/\sigma_o$ ratio of less than 0.82.

In the present invention, $\sigma_{(\leq 120°C.)}/\sigma_o$ is determined by the following procedure.

About 4 mg of a sample wax is weighed, and brought to its melting temperature to melt it, followed by allowing it to cool and solidify. In a differential scanning calorimeter (Model 990, made by E. I. du Pont de Nemours & Co.), the sample wax is heated at a rate of 10° C./min. to obtain its endothermic spectral chart. Using the resulting chart, the total area $\sigma_o$ defined by the entothermic spectral line and the base line thereof and the area $\sigma_{(\leq 120°C.)}$ defined by the endothermic spectral line at 120° C. or below and the base line thereof are determined, and the $\sigma_{(\leq 120°C.)}/\sigma_o$ ratio is calculated.

The process of this invention has the advantage that the amount of the wax obtained per unit amount of catalyst is large, the undesirable conversion of ethylene to ethane is inhibited, the yield of the wax based on ethylene consumed is high, and low-molecular weight waxes can be produced at a relatively low hydrogen partial pressure.

The molecular weight in this invention denotes viscosity average molecular weight. The viscosity average molecular weight is determined by measuring the intrinsic viscosity $[\eta]$ of a sample in decalin at 135° C., and calculating the viscosity average molecular weight in accordance with the following equation.

$$\overline{M} = 2.51 \times 10^4 \times [\eta]^{1.235}$$

EXAMPLES 1 TO 3

Catalyst preparation

Commercially available anhydrous magnesium chloride (25 g) was suspended in 500 ml of n-decane in an atmosphere of nitrogen, and 102 g (3 moles per mole of magnesium chloride) of 2-ethylhexyl alcohol was added. With stirring, the mixture was gradually heated, and reacted at 130° C. for 1 hour. The reaction product became a clear colorless solution. The resulting n-decane solution of a complex of magnesium chloride with 2-ethylhexyl alcohol was stirred at room temperature with 4.47 g (1/20 mole per mole of magnesium chloride) of Ti(O n-$C_4H_9$)$_4$. The mixture was a uniform solution. Thus, a Ti(O n-$C_4H_9$)$_4$/magnesium chloride-2-ethylhexyl alcohol complex solution was obtained.

Polymerization

The inside of a 2-liter stainless steel autoclave was fully purged with nitrogen, and then 1 liter of dehydrated and purified n-decane was fed into it. Then, triethyl aluminum and ethyl aluminum sesquichloride were added in the amounts indicated in Table 1. Furthermore, 0.007 millimoles, calculated as Ti atom, of the Ti(O n-$C_4H_9$)$_4$/magnesium chloride-2-ethylhexyl alcohol complex was introduced, and the mixture was heated rapidly to 170° C. Then, hydrogen was fed under a pressure of 15 kg/cm$^2$.G, and ethylene was introduced so that the total pressure of the system reached 30 kg/cm$^2$. At this time, the temperature of the reaction system rose to 190° C. Ethylene was continuously fed so that the total pressure of the system was always maintained at 30 kg/cm$^2$.G. The reaction system was maintained at 190° C. for 1 hour. After the polymerization, the polymerization vessel was cooled, and the pressure was released. A large excess of methanol was added to the resulting n-decane suspension of polymer and the mixture was fully stirred. The polymer was then separated, and fully dried at a high temperature. The results are shown in Table 1.

At the end of the polymerization, the feeding of ethylene was stopped, and the gas inside the polymerization vessel was recovered in a separate vessel. It was cooled to room temperature and analyzed by gas chromatography. This gas was found to consist of the unreacted ethylene, hydrogen and ethane. The ratio of ethane formation was calculated by the following equation, and the results are shown in Table 1.

$$\text{Ratio of ethane formation (\%)} = \frac{\text{Moles of ethane formed}}{\left(\begin{array}{c}\text{Moles of}\\\text{ethane}\\\text{formed}\end{array}\right) + \left(\begin{array}{c}\text{Moles of}\\\text{ethylene}\\\text{converted}\\\text{to polymer}\end{array}\right)} \times 100$$

COMPARATIVE EXAMPLE 1

The procedure of Examples 1 to 3 was repeated except that the Cl/Al mole ratio of triethyl aluminum and ethyl aluminum sesquichloride was adjusted to 1.0. The results are shown in Table 1.

COMPARATIVE EXAMPLE 2

The procedure of Examples 1 to 3 was repeated except that ethyl aluminum sesquichloride was not used. The results are shown in Table 1.

TABLE 1

| Example (Ex.) or Comparative Example (CEx.) | Amounts of catalyst components (millimoles/liter) | | | Halogen/ Al ratio | Polymerization temperature (°C.) | H$_2$ pressure (kg/cm$^2$ · G) | Amount of wax (g) | Activity (g-wax/ mM · Ti) | Viscosity average molecular weight | Ratio of ethane formation (%) |
|---|---|---|---|---|---|---|---|---|---|---|
| | (A) Ti compound (as Ti) | (B-1) Al(Et)$_3$ | (B-2) Al(Et)$_{1.5}$Cl$_{1.5}$ | | | | | | | |
| Ex. 1 | 0.012 | 0.60 | 0.60 | 3/4 | 190 | 15 | 384 | 32000 | 2600 | 0.47 |
| Ex. 2 | " | 0.80 | 0.40 | 1/2 | " | " | 402 | 33500 | 2300 | 0.32 |
| Ex. 3 | " | 1.04 | 0.16 | 1/5 | " | " | 312 | 26000 | 2900 | 0.50 |
| CEx. 1 | " | 0.40 | 0.80 | 1 | " | " | 240 | 20000 | 3600 | 1.2 |

TABLE 1-continued

| Example (Ex.) or Comparative Example (CEx.) | Amounts of catalyst components (millimoles/liter) | | | Halogen/ Al ratio | Polymerization temperature (°C.) | $H_2$ pressure (kg/cm² · G) | Amount of wax (g) | Activity (g-wax/ mM · Ti) | Viscosity average molecular weight | Ratio of ethane formation (%) |
|---|---|---|---|---|---|---|---|---|---|---|
| | (A) Ti compound (as Ti) | (B-1) Al(Et)₃ | (B-2) Al(Et)$_{1.5}$Cl$_{1.5}$ | | | | | | | |
| CEx. 2 | " | 1.20 | — | 0 | " | " | 49.2 | 4100 | 7800 | 2.9 |

EXAMPLE 4

The inside of a 2-liter stainless steel autoclave was fully purged with nitrogen, and 1 liter of dehydrated and purified n-decane was fed into it. Then, the autoclave was charged with 0.60 millimole of triethyl aluminum, 0.60 millimole of diethyl aluminum monochloride, and 0.012 millimole, calculated as Ti atom, of the Ti(O n-C₄H₉)₄/magnesium chloride-2-ethylhexyl alcohol complex solution obtained in Example 1. The mixture was rapidly heated to 170° C. Hydrogen was fed to a partial pressure of 12 kg/cm².G, and ethylene was introduced so that the total pressure of the system reached 30 kg/cm². Simultaneously, liquefied propylene was fed at a rate of 60 g/hr. At this time, the temperature of the mixture rose to 190° C. Ethylene was continuously fed so that the total pressure of the reaction system was always maintained at 30 kg/cm². The system was maintained at 190° C. for 1 hour. After the polymerization, the polymerization vessel was cooled, and the pressure was released. A large excess of methanol was added to the resulting n-decane suspension of polymer, and the mixture was fully stirred. The polymer was separated, and fully dried at a high temperature. The results obtained are shown in Table 2.

EXAMPLE 5

The procedure of Example 4 was repeated except that liquid 4-methyl-1-pentene was fed at a rate of 250 g/hr instead of propylene and the amounts of the catalyst compounds (B-1) and (B-2) were varied. The results are shown in Table 2.

TABLE 2

| Example | Catalyst components (millimoles/liter) | | | Halogen/ Al Ratio | Polymerization temperature (°C.) | $H_2$ pressure (kg/cm²) | Alpha-olefin co-monomer | Amount of wax (g) | Activity (g · wax/ mM · Ti) | Viscosity average molecular weight | Alpha-olefin content (mole %) | Ratio of ethane formation (%) |
|---|---|---|---|---|---|---|---|---|---|---|---|---|
| | (A) Ti compound (as Ti) | (B-1) Al(Et)₃ | (B-2) Al(Et)₂Cl | | | | | | | | | |
| 4 | 0.012 | 0.60 | 0.60 | 1/2 | 190 | 12 | Propylene | 423.6 | 35300 | 2200 | 6.5 | 0.30 |
| 5 | 0.012 | 0.90 | 0.30 | 1/4 | 190 | 12 | 4-Methyl-1-pentene | 335.0 | 27900 | 2400 | 7.6 | 0.43 |

EXAMPLES 6 TO 10

The procedure of Examples 1 to 3 was repeated except that n-butyl chloride or silicon tetrachloride was used as the halogen compound (B-2) instead of ethyl aluminum sesquichloride, and the partial pressure of hydrogen and the polymerization temperature were varied as shown in Table 3. The results are also shown in Table 3.

COMPARATIVE EXAMPLES 3 AND 4

The procedures of Examples 6 and 7 were repeated except that the halogen compound (B-2) was not added. The results are shown in Table 3.

TABLE 3

| Example (Ex.) or Comparative Example (CEx.) | Amounts of catalyst components (millimoles/liter) | | | Halogen/ Al ratio | Polymerization temperature (°C.) | $H_2$ pressure (kg/cm² · G) | Amount of wax (g) | Activity (g-wax/ mM · Ti) | Viscosity average molecular weight | Ratio of ethane formation (%) |
|---|---|---|---|---|---|---|---|---|---|---|
| | (A) Ti compound (as Ti) | (B-1) Al(Et)₃ | (B-2) Halogen compound | | | | | | | |
| Ex. 6 | 0.012 | 1.20 | n-Butyl chloride 0.60 | 1/2 | 200 | 15 | 319.2 | 26600 | 2100 | 0.41 |
| Ex. 7 | " | " | n-Butyl chloride 0.60 | " | " | 20 | 208.8 | 17400 | 1000 | 0.71 |
| Ex. 8 | " | " | n-Butyl chloride 0.60 | " | " | 13 | 444.0 | 37000 | 3900 | 0.37 |
| Ex. 9 | " | " | n-Butyl chloride 0.60 | " | 180 | 15 | 513.0 | 42800 | 3300 | 0.39 |
| Ex. 10 | " | " | SiCl₄ 0.20 | 2/3 | 200 | " | 270.0 | 22500 | 2300 | 0.59 |
| CEx. 3 | " | " | — | 0 | " | " | 33.6 | 2800 | 6200 | 3.2 |
| CEx. 4 | " | " | — | 0 | " | 20 | 14.4 | 1200 | 4300 | 4.1 |

EXAMPLES 11 AND 12

Ethylene was copolymerized with propylene or 4-methyl-1-pentene in the same way as in Example 4 or 5 except that n-butyl chloride or silicon tetrachloride in the amounts shown in Table 4 was used instead of the diethyl aluminum monochloride as the halogen compound (B-2), and the polymerization temperature was changed to 200° C. The results are shown in Table 4.

EXAMPLE 16

Preparation of a catalyst

TABLE 4

| Example | Catalyst components (millimoles/liter) | | | Halogen/ Al ratio | Polymerization temperature (°C.) | H₂ pressure (kg/cm²) | Alpha-olefin co-monomer | Amount of wax (g) | Activity (g · wax/ mM · Ti) | Viscosity average molecular weight | Alpha-olefin content (mole %) | Ratio of ethane formation (%) |
|---|---|---|---|---|---|---|---|---|---|---|---|---|
| | (A) Ti compound (as Ti) | (B-1) Al(Et)₃ | (B-2) Halogen compound | | | | | | | | | |
| 11 | 0.012 | 1.20 | n-Butyl chloride 3.6 | 3 | 200 | 12 | Propylene | 314.4 | 26200 | 2700 | 6.0 | 0.48 |
| 12 | 0.012 | 1.20 | SiCl₄ 0.075 | 1/4 | 200 | 12 | 4-Methyl-1-pentene | 291.6 | 24300 | 2600 | 6.4 | 0.52 |

EXAMPLES 13 TO 15

One hundred stainless steel balls having a diameter of 15 mm were put into an 800 ml cylindrical stainless steel vessel, and 20 g of anhydrous magnesium chloride and 3.98 g of TiCl₄ were charged into the vessel in an atmosphere of nitrogen. Then, the vessel was closed, and the magnesium chloride was pulverized at room temperature and at a rotating speed of 120 rpm for 10 hours. The pulverized product was taken out under a nitrogen atmosphere, and washed with a sufficient amount of hexane. The pulverized product contained 2.4% by weight of Ti.

The procedures of Examples 2, 6 and 10 were respectively repeated except that the resulting titanium catalyst component was used instead of the Ti(O n-C₄H₉)₄/magnesium chloride-2-ethylhexyl alcohol complex solution. The results are shown in Table 5.

COMPARATIVE EXAMPLE 5

The procedure of Example 14 are repeated except that ethylene dichloride was used instead of n-butyl chloride as the halogen compound (B-2). The results are shown in Table 5.

COMPARATIVE EXAMPLE 6

The procedure of Example 14 was repeated except that the halogen compound (B-2) was not used. The results are shown in Table 5.

Commercially available anhydrous magnesium chloride (25 g) was suspended in 500 ml of n-decane in an atmosphere of nitrogen, and 102 g (3 moles per mole of magnesium chloride) of 2-ethylhexyl alcohol was added. With stirring, the temperature was gradually raised, and the mixture was reacted at 130° C. for 1 hour. The reaction product was a clear colorless solution. To the resulting n-decane solution of a magnesium chloride-2-ethylhexyl alcohol complex was added 4.47 g (1/20 moles per mole of magnesium chloride) of Ti(O n-C₄H₉) at room temperature. The mixture was a uniform solution. Thus, a Ti(O n-C₄H₉)₄/magnesium-2-ethylhexyl alcohol complex solution was obtained.

Polymerization

The inside of a 2-liter stainless autoclave was purged fully with nitrogen, and it was then charged with 1 liter of dehydrated and purified n-decane, 0.70 millimole of triethyl aluminum, 0.35 millimole of n-butyl chloride and 0.007 millimoles, calculated as Ti atom, of the resulting Ti(O n-C₄H₉)₄/magnesium-2-ethylhexyl alcohol complex solution. The mixture was rapidly heated to 180° C. Then, hydrogen was introduced to a partial pressure of 25 kg/cm².G, and ethylene was added so that the total pressure of the system reached 30 kg/cm². At this time, the temperature of the system rose to 200° C. Ethylene was continuously fed so that the total pressure of the system was maintained always at 30 kg/cm². The system was maintained at 200° C. for 1 hour. After the polymerization, the polymerization vessel was cooled and the pressure was released. A large excess of methanol was added to the resulting n-decane suspension of polymer, and they were stirred fully. The poly-

TABLE 5

| Example (Ex.) or Comparative Example (CEx.) | Amounts of catalyst components (millimoles/liter) | | | Halogen/ Al ratio | Polymerization temperature (°C.) | H₂ pressure (kg/cm² · G) | Amount of wax (g) | Activity (g-wax/ mM · Ti) | Viscosity average molecular weight | Ratio of ethane formation (%) |
|---|---|---|---|---|---|---|---|---|---|---|
| | (A) Ti compound (as Ti) | (B-1) Al(Et)₃ | (B-2) Halogen compound | | | | | | | |
| Ex. 13 | 0.012 | 0.80 | Ethyl aluminum sesquichloride 0.40 | 1/2 | 200 | 15 | 265.2 | 22100 | 2300 | 0.51 |
| Ex. 14 | " | 1.2 | n-Butyl chloride 0.60 | 1/2 | " | " | 262.8 | 21900 | 2700 | 0.66 |
| Ex. 15 | " | " | Tetrachlorosilane 0.20 | 2/3 | " | " | 243.6 | 20300 | 2300 | 0.52 |
| CEx. 5 | " | " | Ethylene dichloride 9.0 | 15 | " | " | 195.6 | 16300 | 3000 | 1.5 |
| CEx. 6 | " | " | — | 0 | " | " | 24.0 | 2000 | 9700 | 3.9 | mer was separated, and fully dried at a high temperature. The results are shown in Table 6.

EXAMPLES 17 TO 19

The procedure of Example 16 was repeated except that the partial pressure of hydrogen and the polymerization temperature were varied as shown in Table 6. The results are also shown in Table 6.

EXAMPLE 20

The procedure of Example 16 was repeated except that 0.12 millimole of silicon tetrachloride was used instead of n-butyl chloride used in Example 16 at the time of polymerization. The results are shown in Table 6.

EXAMPLE 21

In a 300 ml glass flask, 6.7 g of anhydrous aluminum chloride was suspended in 200 ml of dehydrated and purified aluminum, and 17.1 g of triethyl aluminum was added dropwise and reacted at room temperature for 20 minutes. The mixture became a clear colorless solution. Thus, there was obtained a solution of the reaction product of aluminum chloride and triethyl aluminum.

Ethylene was polymerized in the same way as in Example 16 except that instead of separately adding 0.70 millimole of triethyl aluminum and 0.35 millimole of n-butyl chloride, the resulting solution of the reaction product of aluminum chloride and triethyl aluminum was added in an amount of 0.70 millimole calculated as Ti atom. The results are shown in Table 6.

COMPARATIVE EXAMPLES 7 TO 9

The same polymerization as in Examples 16, 20 and 21, respectively, was performed except that no halogen compound (B-2) was added; to adjust the amount of the final polymer to at least 30 g, the Ti-Mg component and triethyl aluminum were used in amounts five times as large as those in the aforesaid Examples; and that the partial pressure of hydrogen was changed as shown in Table 6. The results are shown in Table 6.

TABLE 6

| Example (Ex.) or Comparative Example (CEx.) | Amounts of catalyst components (millimoles/liter) | | | Halogen/ Al ratio | Polymerization temperature (°C.) | $H_2$ pressure ($kg/cm^2 \cdot G$) | Amount of wax (g) | Activity (g-wax/ mM · Ti) | Viscosity average molecular weight | Ratio of ethane formation (%) |
|---|---|---|---|---|---|---|---|---|---|---|
| | (A) Ti compound (as Ti) | (B-1) Al(Et)$_3$ | (B-2) Halogen compound | | | | | | | |
| Ex. 16 | 0.007 | 0.70 | n-Butyl chloride 0.35 | 1/2 | 200 | 15 | 187 | 26700 | 2100 | 0.41 |
| Ex. 17 | " | " | n-Butyl chloride 0.35 | " | " | 20 | 125 | 17900 | 1000 | 0.71 |
| Ex. 18 | " | " | n-Butyl chloride 0.35 | " | " | 13 | 262 | 37400 | 3900 | 0.37 |
| Ex. 19 | " | " | n-Butyl chloride 0.35 | " | 180 | 15 | 302 | 43100 | 3300 | 0.29 |
| Ex. 20 | " | " | Tetrachlorosilane 0.12 | 7/10 | 200 | " | 160 | 22900 | 2300 | 0.59 |
| Ex. 21 | " | " | Reaction product of Et$_3$Al and AlCl$_3$ (0.70) | 1/2 | " | " | 196 | 25000 | 1900 | 0.44 |
| CEx. 7 | 0.035 | 3.5 | — | 0 | " | 13 | 151 | 11000 | 4300 | 2.8 |
| CEx. 8 | " | " | — | 0 | " | 15 | 91 | 8100 | 2600 | 3.2 |
| CEx. 9 | " | " | — | 0 | " | 20 | 38.5 | 4500 | 1100 | 4.1 |

EXAMPLES 22 TO 24

One hundred stainless steel balls having a diameter of 15 mm were put into an 800 ml cylindrical stainless steel vessel, and 20 g of anhydrous magnesium and 3.98 g of TiCl$_4$ were charged in an atmosphere of nitrogen. The vessel was closed, and the magnesium chloride was pulverized at room temperature and at a rotating speed of 120 rpm for 10 hours. The pulverization product was taken out under a nitrogen atmosphere, and washed with a sufficient amount of hexane. The pulverization product contained 2.4% by weight of Ti.

The same polymerization as set forth in Examples 16, 20 and 21, respectively, was performed except that the resulting titanium catalyst component was used instead of the Ti(O n-C$_4$H$_9$)$_4$/magnesium-2-ethylhexyl alcohol complex solution. The results are shown in Table 7.

COMPARATIVE EXAMPLE 10

The procedure of Examples 22 to 24 was repeated except that no halogen compound (B-2) was added, and the amounts of the titanium catalyst component and triethyl aluminum used in Examples 22 to 24 were increased to five times. The results are shown in Table 7.

TABLE 7

| Example (Ex.) or Comparative Example (CEx.) | Amounts of catalyst components (millimoles/liter) | | | Halogen/Al ratio | Polymerization temperature (°C.) | $H_2$ pressure (kg/cm$^2$·G) | Amount of wax (g) | Activity (g-wax/ mM·Ti) | Viscosity average molecular weight | Ratio of ethane formation (%) |
|---|---|---|---|---|---|---|---|---|---|---|
| | (A) Ti compound (as Ti) | (B-1) Al(Et)$_3$ | (B-2) Halogen compound | | | | | | | |
| Ex. 22 | 0.007 | 0.70 | n-Butyl chloride 0.35 | 1/2 | 200 | 15 | 153 | 21900 | 2400 | 0.61 |
| Ex. 23 | " | " | Tetrachlorosilane 0.12 | 7/10 | " | " | 142 | 20300 | 2700 | 0.66 |
| Ex. 24 | | | Reaction product of Et$_3$Al and AlCl$_3$ (0.70) | 1/2 | " | " | 161 | 23000 | 2300 | 0.52 |
| CEx. 10 | 0.035 | 3.5 | — | 0 | " | " | 63 | 1800 | 10000 | 3.9 |

What we claim is:

1. In a process for preparing an ethylene polymer wax which comprises polymerizing ethylene or copolymerizing ethylene with up to 10 mole% of an alpha-olefin having 3 to 30 carbon atoms in an inert hydrocarbon solvent at a temperature of about 140° C. to about 300° C. and a pressure of about 5 to about 200 kg/cm$^2$.G in the presence of hydrogen and a catalyst composed of (A) a highly active titanium catalyst component activated by a magnesium compound and obtained by copulverizing an inorganic magnesium compound selected from the group consisting of magnesium chloride, magnesium bromide, magnesium iodide, magnesium fluoride, magnesium hydroxide, magnesium oxide and magnesium hydroxyhalides and a titanium compound, or by reacting said inorganic magnesium compound which has been treated with an electron donor with a titanium compound and (B) an organoaluminum catalyst component; the improvement wherein (i) said organoaluminum catalyst component is composed of (B-1) an organoaluminum compound free from halogen bonded directly to the aluminum atom selected from the group consisting of trialkyl aluminums having a $C_1$–$C_{15}$ alkyl group and alkyl aluminum hydrides having $C_1$–$C_{15}$ alkyl group and (B-2) a halogen compound selected from the group consisting of aluminum trihalides, halogen compounds of aluminum having a $C_1$–$C_{15}$ alkyl group, halogen compounds of aluminum having a $C_1$–$C_{15}$ alkoxy group, halogen compounds of $C_1$–$C_{20}$ aliphatic hydrocarbon, halogen compounds of a $C_6$–$C_{20}$ aromatic hydrocarbon, tetrahalosilanes halogen compounds of silicon having a $C_1$–$C_{12}$ alkyl group and halogen compounds of silicon having a $C_1$–$C_{12}$ alkoxy group the atomic ratio of halogen to aluminum in the organoaluminum catalyst component (B) being from about 1:6 to about 9:10, provided that when said halogen compound is a halogen compound of carbon, this atomic ratio is from about 1:6 to about 10:1, and (ii) said polymerization or copolymerization is carried out under such conditions that the concentration of ethylene polymer wax in the polymerization or copolymerization system is about 200 to about 600 g/liter of solvent, to form a wax having a viscosity average molecular weight of up to about 6000.

2. The process according to claim 1 wherein said inorganic magnesium compound is magnesium chloride.

3. The process of claim 1 wherein the amount of the titanium catalyst component (A), calculated as titanium atom, is about 0.0005 to about 1 millimole/liter of solvent.

4. The process of claim 1 wherein the amount of the organoaluminum catalyst component (B) is such that the atomic ratio of Al in said component (B) to Ti in component (A) is from about 5 to about 2000.

5. The process of claim 1 wherein the partial pressure of hydrogen in the polymerization or copolymerization system in maintained at a value at least about 0.7 time that of ethylene in said system.

6. The process of claim 1 for preparing an ethylene homopolymer wax by polymerizing ethylene.

7. The process of claim 1 for preparing an ethylene copolymer wax by copolymerizing ethylene with up to 10 mole percent of an α-olefin having 3 to 20 carbon atoms.

8. The process of claim 1 wherein said halogen compound (B-2) is a halogen compound of aluminum.

9. The process of claim 8 wherein said organoaluminum catalyst component (i) is the reaction product of said organoaluminum compound (B-1) and said halogen compound (B-2).

10. The process of claim 9 wherein said organoaluminum catalyst component (i) is the reaction product of triethylaluminum as the organoaluminum compound (B-1) and aluminum trichloride as said halogen compound (B-2).

11. The process of claim 1 wherein said halogen compound (B-2) is a halogen compound of silicon.

12. The process of claim 11 wherein said halogen compound (B-2) is tetrachlorosilane.

13. The process of claim 1 wherein said halogen compound (B-2) is a halogen compound of carbon.

14. The process of claim 13 wherein said halogen compound (B-2) is n-butyl chloride.

* * * * *